(12) United States Patent
Sivaraman et al.

(10) Patent No.: US 11,374,835 B2
(45) Date of Patent: Jun. 28, 2022

(54) APPARATUS AND PROCESS FOR DETECTING NETWORK SECURITY ATTACKS ON IOT DEVICES

(71) Applicant: NewSouth Innovations Pty Limited, Sydney (AU)

(72) Inventors: Vijay Sivaraman, Sydney (AU); Hassan Habibi Gharakheili, Sydney (AU); Mohammed Ayyoob Ahamed Hamza, Sydney (AU)

(73) Assignee: NewSouth Innovations Pty Limited, Melbourne (AU)

( * ) Notice: Subject to any disclaimer, the term of this patent is extended or adjusted under 35 U.S.C. 154(b) by 0 days.

(21) Appl. No.: 17/309,677

(22) PCT Filed: Dec. 13, 2019

(86) PCT No.: PCT/AU2019/051372
§ 371 (c)(1),
(2) Date: Jun. 14, 2021

(87) PCT Pub. No.: WO2020/118375
PCT Pub. Date: Jun. 18, 2020

(65) Prior Publication Data
US 2022/0086064 A1    Mar. 17, 2022

(30) Foreign Application Priority Data
Dec. 14, 2018    (AU) .................................. 2018904761

(51) Int. Cl.
*G06F 15/173* (2006.01)
*H04L 43/026* (2022.01)
(Continued)

(52) U.S. Cl.
CPC ............ *H04L 43/026* (2013.01); *G16Y 40/10* (2020.01); *G16Y 40/35* (2020.01); *H04L 47/115* (2013.01);
(Continued)

(58) Field of Classification Search
None
See application file for complete search history.

(56) References Cited

U.S. PATENT DOCUMENTS 7,987,261 B2 * 7/2011 Gamble ................ G06F 16/951
709/224
8,180,918 B2 * 5/2012 Day ........................ H04L 61/10
709/235
(Continued)

FOREIGN PATENT DOCUMENTS

WO    WO 2005/017813    2/2005

*Primary Examiner* — Quang N Nguyen
(74) *Attorney, Agent, or Firm* — Knobbe Martens Olson & Bear LLP

(57) ABSTRACT

Some embodiments include a network attack detection process, including, for each of a plurality of IoT devices of a communications network: receiving corresponding network traffic data representing network traffic characteristics of a plurality of network traffic flows of the device; processing the network traffic data to generate a plurality of corresponding features for each of the network traffic flows; and applying a corresponding set of one-class flow classifiers to the generated features to classify network traffic flows of the device and assess whether the network traffic characteristics of the network traffic flows are indicative of the device being under attack or having been compromised; wherein the flow classifiers are trained with training data representing normal network traffic behaviour of the device in an uncompromised state.

20 Claims, 8 Drawing Sheets

(51) Int. Cl.
*G16Y 40/10* (2020.01)
*G16Y 40/35* (2020.01)
*H04L 47/11* (2022.01)
*H04L 47/125* (2022.01)
*H04L 9/40* (2022.01)
*H04L 67/12* (2022.01)

(52) U.S. Cl.
CPC ........ *H04L 47/125* (2013.01); *H04L 63/1425* (2013.01); *H04L 67/12* (2013.01)

(56) References Cited

U.S. PATENT DOCUMENTS

| | | |
|---|---|---|
| 9,094,444 B2 | 7/2015 | Baltatu et al. |
| 9,674,207 B2 | 6/2017 | Di Pietro et al. |
| 10,560,365 B1* | 2/2020 | Losito .................... H04L 43/08 |
| 10,601,851 B2* | 3/2020 | Horstmeyer ............ G10L 25/51 |
| 2007/0063548 A1 | 3/2007 | Eipper |
| 2008/0201278 A1 | 8/2008 | Muller |
| 2009/0089449 A1* | 4/2009 | Day ........................ H04L 69/24 709/235 |
| 2011/0173264 A1* | 7/2011 | Kelly ...................... G06F 16/94 709/205 |
| 2011/0267964 A1 | 11/2011 | Baltatu et al. |
| 2016/0028752 A1 | 1/2016 | Di Pietro et al. |
| 2018/0103056 A1 | 4/2018 | Kohout et al. |

* cited by examiner

APPARATUS AND PROCESS FOR DETECTING NETWORK SECURITY ATTACKS ON IOT DEVICES

TECHNICAL FIELD

The present invention relates to network security, and in particular to a system and process for detecting network security attacks on Internet-of-Things (IoT) devices.

BACKGROUND

Networked devices continue to become increasingly ubiquitous in a wide variety of settings, including businesses and other organisations, and domestic settings. In particular, the addition of network connectivity to sensors and appliance-type devices generally dedicated to a specific task has created a new class of devices and interconnectivity, generally referred to as an 'Internet-of-Things', or simply 'IoT'. Examples of IoT devices include lightbulbs, doorbells, power switches, weight scales, security cameras, air conditioning equipment, home automation and voice-activated Internet interfaces in the general form of audio speakers (e.g., Google Home and Amazon Echo) and other 'smart' devices, including a wide variety of networked sensors most commonly used to sense environmental parameters such as temperature, humidity, motion, smoke and air quality.

The proliferation of insecure Internet-connected devices is making it easier for cyber-hackers to attack home, enterprise, and critical infrastructures at large scale. Recent reports show that attackers continue to exploit insecure IoT devices to launch volumetric attacks in the form of DoS, DDoS, brute force, TCP SYN/UDP flooding, and port-scan attacks. Moreover, the progression of botnets such as Mirai and Persirai, infecting millions of IoT devices, is enabling destructive cyber-campaigns of unprecedented magnitude to be launched.

Network operators today lack the tools to know whether the IoT devices connected to their network are behaving normally or have been cyber-breached. In fact, most operators would not even know what "normal" behaviour is, given the myriad IoT devices in the market with different functionalities and from various manufacturers.

It is desired, therefore, to overcome or alleviate one or more difficulties of the prior art, or to at least provide a useful alternative.

SUMMARY

In accordance with some embodiments of the present invention, there is provided a network attack detection process, including, for each of a plurality of IoT devices of a communications network:
  receiving corresponding network traffic data representing network traffic characteristics of a plurality of network traffic flows of the device;
  processing the network traffic data to generate a plurality of corresponding features for each of the network traffic flows; and
  applying a corresponding set of one-class flow classifiers to the generated features to classify network traffic flows of the device and assess whether the network traffic characteristics of the network traffic flows are indicative of the device being under attack or having been compromised;
  wherein the flow classifiers are trained with training data representing normal network traffic behaviour of the device in an uncompromised state.

In some embodiments, the plurality of features for each network traffic flow is generated from packet and byte counts of the network traffic flow over sliding windows.

In some embodiments, the plurality of features for each network traffic flow represents statistical measures generated from packet and byte counts for sliding windows of different durations. In some embodiments, the statistical measures include totals, means, and standard-deviations generated from packet counts and byte counts for each of the sliding windows.

In some embodiments, the process includes using principal component analysis to reduce the number of features for each classifier.

In some embodiments, the process includes training the set of one-class classifiers trained with the training data representing normal network traffic behaviour of the device in an uncompromised state, the training data being generated from network flow counters of a network switch.

In some embodiments, the process includes, for each said IoT device, processing a "Manufacturer Usage Description" (MUD) profile of the device to generate corresponding flow rules, and causing the generated flow rules to be added to a flow table of the network switch.

In some embodiments, the flow classifiers are only applied to network traffic that conforms to a "Manufacturer Usage Description" (MUD) profile of the device.

In some embodiments, the process includes separately detecting network traffic of the device that does not conform to the MUD profile of the device.

In some embodiments, the process includes, for each of the plurality of IoT devices:
  applying at least one corresponding one-class network traffic classifier to assess whether network traffic characteristics of the device are indicative of the device being under attack or having been compromised;
  wherein the step of applying a corresponding set of flow classifiers is executed only if the device has been assessed as being under attack or as having been compromised.

In some embodiments, the step of applying at least corresponding one-class network traffic classifier includes:
  applying a corresponding one-class local traffic classifier to assess whether local network traffic characteristics of the device are indicative of the device being under attack or having been compromised; and
  applying a corresponding one-class internet traffic classifier to independently assess whether internet traffic characteristics of the device are indicative of the device being under attack or having been compromised.

In some embodiments, if the process assesses that the network traffic characteristics of an IoT device are indicative of the device being under attack or having been compromised, then the process includes generating flow identification data that identifies one or more corresponding abnormal network flows of the device.

In accordance with some embodiments of the present invention, there is provided a network attack detection apparatus configured to execute the process of any one of the above processes.

In accordance with some embodiments of the present invention, there is provided at least one computer-readable storage medium having stored thereon executable instructions and/or FPGA configuration data that, when the instructions are executed by at least one processor and/or when an FPGA is configured in accordance with the FPGA configuration data, cause the at least one processor and/or the FPGA to execute the process of any one of the above processes.

In accordance with some embodiments of the present invention, there is provided a network attack detection apparatus, including:

a feature generator configured to receive, for each of a plurality of IoT devices of a communications network, corresponding network traffic data representing network traffic characteristics of each of a plurality of network traffic flows of the device, and to process the network traffic data to generate a plurality of corresponding features for each of the network traffic flows; and an anomaly detector including, for each of the IoT devices, a corresponding set of one-class flow classifiers to process the generated features to classify network traffic flows of the device and assess whether the network traffic characteristics of the network traffic flows are indicative of the device being under attack or having been compromised;

wherein the flow classifiers are trained with training data representing normal network traffic behaviour of the device in an uncompromised state.

In some embodiments, the plurality of features for each network traffic flow is generated from packet and byte counts of the network traffic flow over sliding windows.

In some embodiments, the plurality of features for each network traffic flow represents statistical measures generated from packet and byte counts for sliding windows of different durations.

In some embodiments, the statistical measures include totals, means, and standard-deviations generated from packet counts and byte counts for each of the sliding windows.

In some embodiments, the apparatus includes a training component configured to train the set of one-class classifiers with the training data representing normal network traffic behaviour of the device in an uncompromised state, the training data being generated from network flow counters of a network switch.

In some embodiments, the feature generator is configured to use principal component analysis to reduce the number of features.

In some embodiments, the apparatus includes a MUD processing component to process, for each said IoT device, a "Manufacturer Usage Description" (MUD) profile of the device to generate corresponding flow rules, and causing the generated flow rules to be added to a flow table of the network switch.

In some embodiments, each classifier is applied only to network traffic that conforms to a "Manufacturer Usage Description" (MUD) profile of the device.

In some embodiments, the apparatus includes at least one device-level one-class network traffic classifier configured to assess whether network traffic characteristics of the device are indicative of the device being under attack or having been compromised;

wherein the corresponding set of flow classifiers processes the generated features only if the device has been assessed as being under attack or as having been compromised.

In some embodiments, the apparatus includes a specification based intrusion detector to detect network traffic of the device that does not conform to the MUD profile of the device.

In some embodiments, the anomaly detector is configured to identify a corresponding flow of a device representative of an attack or the device having been compromised.

Also described herein is a network attack detection process, including, for each of a plurality of IoT devices of a communications network:

applying a corresponding classifier to classify network traffic of the device to assess whether or not the network traffic is indicative of the device being under attack or having been compromised;

wherein the classifier is a one-class classifier trained with training data representing normal network traffic behaviour of the device in an uncompromised state, the training data representing, for each of a plurality of network traffic flows of the device, a plurality of features characteristic of packet and flow counts of the uncompromised device.

Also described herein is a network attack detection apparatus, including:

a plurality of classifiers for respective known IoT devices;

an anomaly detector to apply a corresponding one of the classifiers to classify network traffic of a corresponding IoT device to assess whether or not the network traffic is indicative of the device being under attack or having been compromised;

wherein the classifier is a one-class classifier trained with training data representing normal network traffic behaviour of the device in an uncompromised state, the training data representing, for each of a plurality of network traffic flows of the device, a plurality of features characteristic of packet and flow counts of the uncompromised device.

BRIEF DESCRIPTION OF THE DRAWINGS

Some embodiments of the present invention are hereinafter described, by way of example only, with reference to the accompanying drawings, wherein.

DETAILED DESCRIPTION

Figure 1:
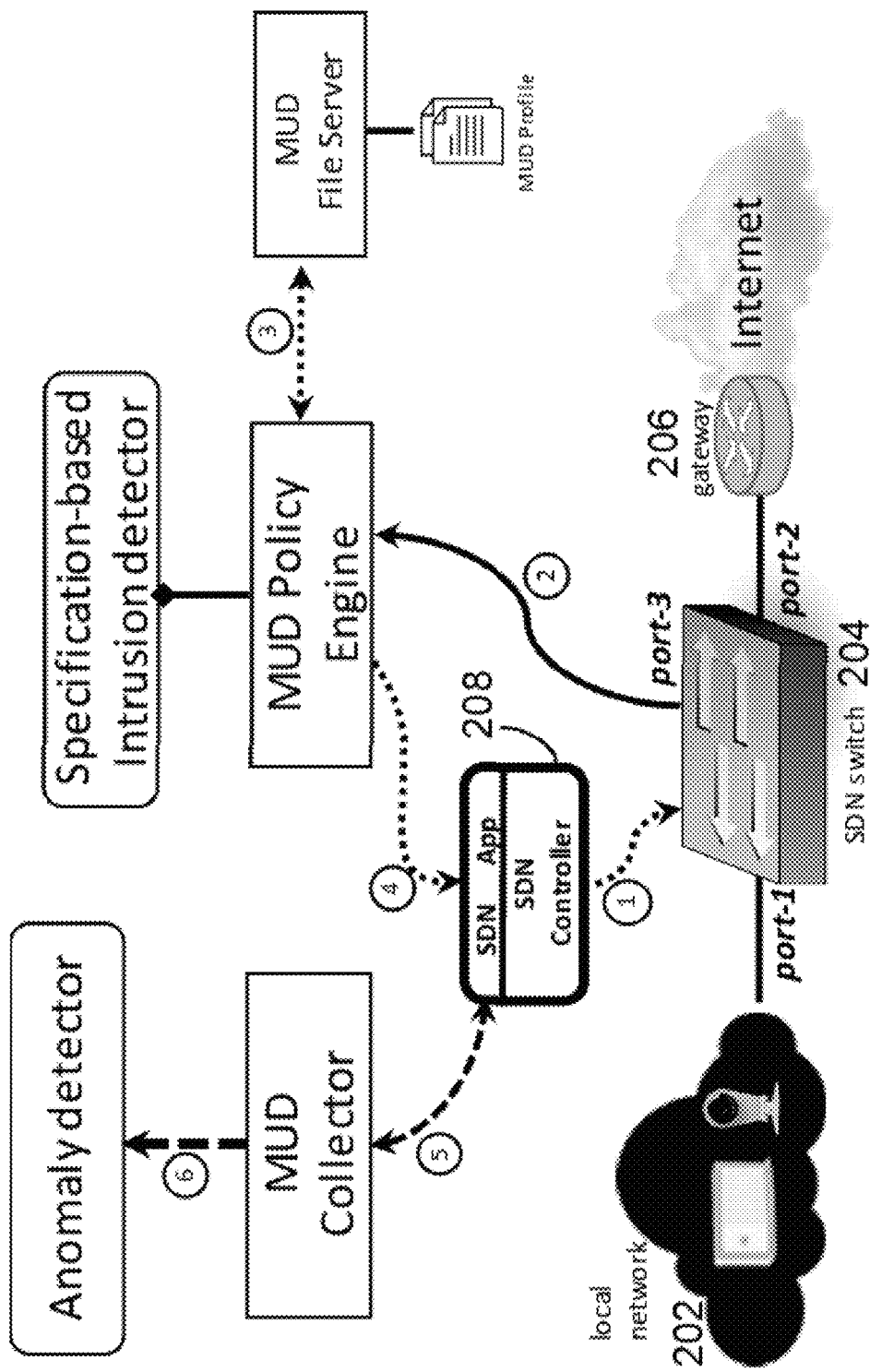
FIG. 1 is a schematic diagram of a network attack detection apparatus in the context of a communications network including IoT devices, and in accordance with the described embodiments of the present invention.

To improve the security of IoT devices, the IETF has recently proposed the "Manufacturer Usage Description" (MUD) Specification, which requires vendors to formally specify the intended network behaviour of the IoT devices they put on to the market. This specification allows a network operator to lock down the network traffic of the IoT device using access control lists (ACLs) derived from its MUD profile; indeed, recent work has used software defined networking (SDN) as a vehicle to translate MUD profiles into static and dynamic flow rules that can be applied at run-time on OpenFlow™-capable switches to limit IoT traffic, thereby significantly reducing their attack surface.

However, the inventors have identified that security attacks can be launched on IoT devices while still conforming to their MUD profiles. In particular, volumetric attacks on an IoT device are not necessarily prevented by its MUD profile, because its ACLs simply allow or deny traffic, and there is no provision to limit rates. As described below, the inventors have identified a range of volumetric attacks (including ones directly on the IoT device and ones that reflect off the IoT device) are feasible in spite of MUD policy enforcement in the network. Fending off such attacks requires more sophisticated machinery that monitors the level of activity associated with each policy rule to detect anomalies.

IoT devices exhibit identifiable traffic patterns (with limited diversity of activity cycles and protocol use), making it feasible to develop machine learning methods for detecting abnormal behaviour, in contrast to general-purpose computers that exhibit much wider diversity in network behaviour.

Described herein are apparatuses and processes that learn expected patterns of MUD-compliant behaviour for each IoT device by monitoring its activity via a combination of coarse-grained (per-device) and fine-grained (per-flow) SDN telemetry at various time scales, and have the capability to detect volumetric attacks and identify the specific traffic streams that contribute to them.

To demonstrate the described apparatuses and processes, real consumer IoT devices were deliberately subjected to volumetric attacks (including ARP spoof, port scanning, TCP SYN flooding, Fraggle, Ping of Death, and SSDP/SNMP/TCP/ICMP reflection) in the inventors' lab, and the resulting network traffic traces were labelled to distinguish attack traffic from benign traffic.

In one example below, an embodiment of the apparatus using an OpenFlow switch, a Faucet SDN controller, and a MUD policy engine was used to quantify the efficacy of the described process in detecting volumetric attacks on several IoT devices, providing a detection accuracy as high as 96.66%.

MUD Profiles

MUD is a relatively new IETF framework, and the specification is still evolving. A valid MUD profile includes a root object "access-lists" container that includes several Access Control Entries (ACE), serialized in JSON (JavaScript Object Notation) format. Access-lists are explicit in describing the direction of communication, i.e., from-device and to-device. Each ACE matches on source/destination port numbers for TCP/UDP packets, and type and code for ICMP packets. The MUD specifications also distinguish local-networks traffic from Internet communications. The MUD proposal defines how a MUD profile needs to be fetched, and how the behaviour of an IoT device needs to be defined. Each MUD profile will be downloaded using a MUD url that is passed to the network by the IoT device through either DHCP, LLDP, or IEEE 802.1ar protocols.

IoT device manufacturers have not yet provided MUD profiles for their devices, but the inventors have automatically generated (from packet traces) MUD profiles for 28 consumer IoT devices, and a subset of those profiles are used as described below.

Figure 4:
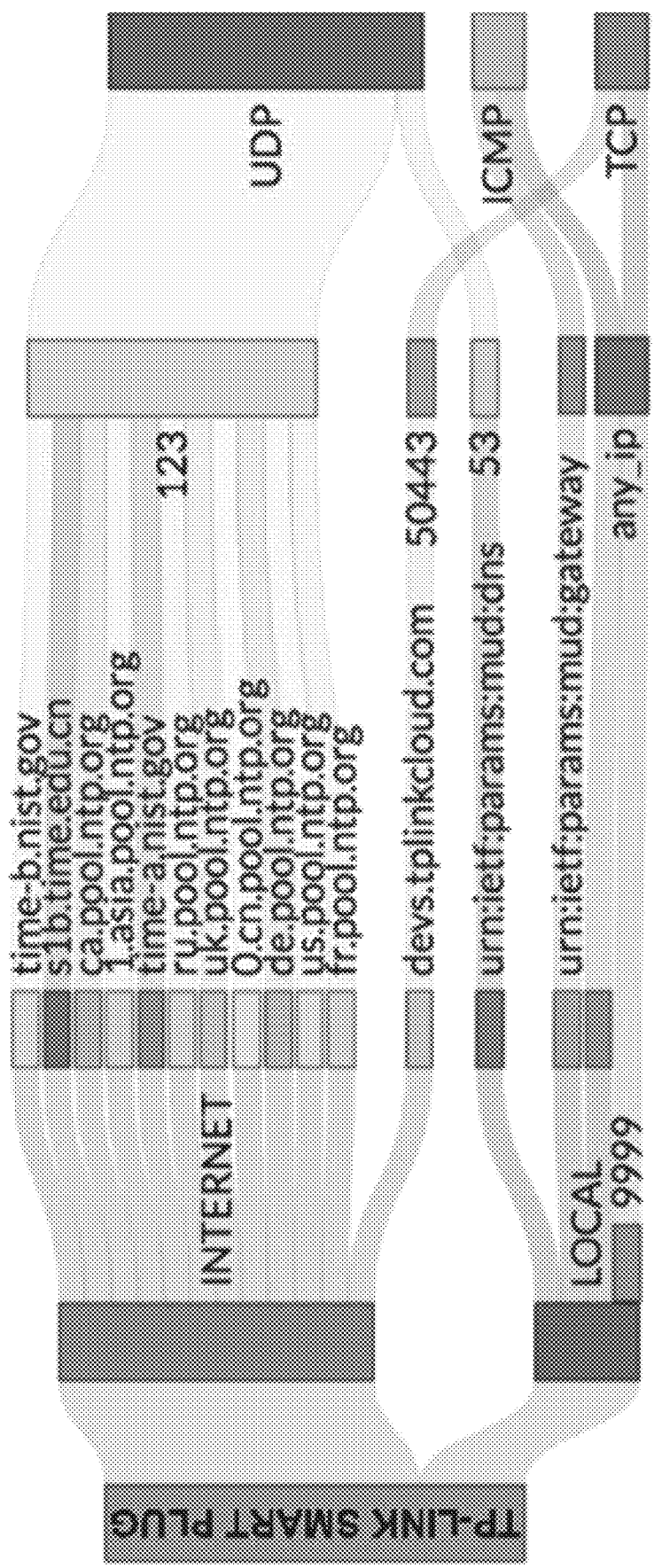
FIG. 4 is a Sankey diagram representation of a MUD (Manufacturer Usage Description) profile of a TP-Link smart plug IoT device.

FIG. 4 visualizes a sample MUD profile in a human-friendly way, using a Sankey diagram to represent the MUD profile of a TP-Link smart plug. It is seen that this IoT device exchanges DNS queries/responses with the local DNS server, communicates with a range of Internet domains for NTP services (i.e., UDP port 123), and talks to its manufacturer's server (devs.tplinkcloud.com) over TCP port 50443. In addition, the TP-Link smart plug exposes TCP port 9999 on the local network to its mobile app for user interaction with the device. It is also apparent that the smart plug and its mobile app send periodic pings the gateway and the plug respectively for connectivity checking.

SDN-Based System Architecture

Figure 2:
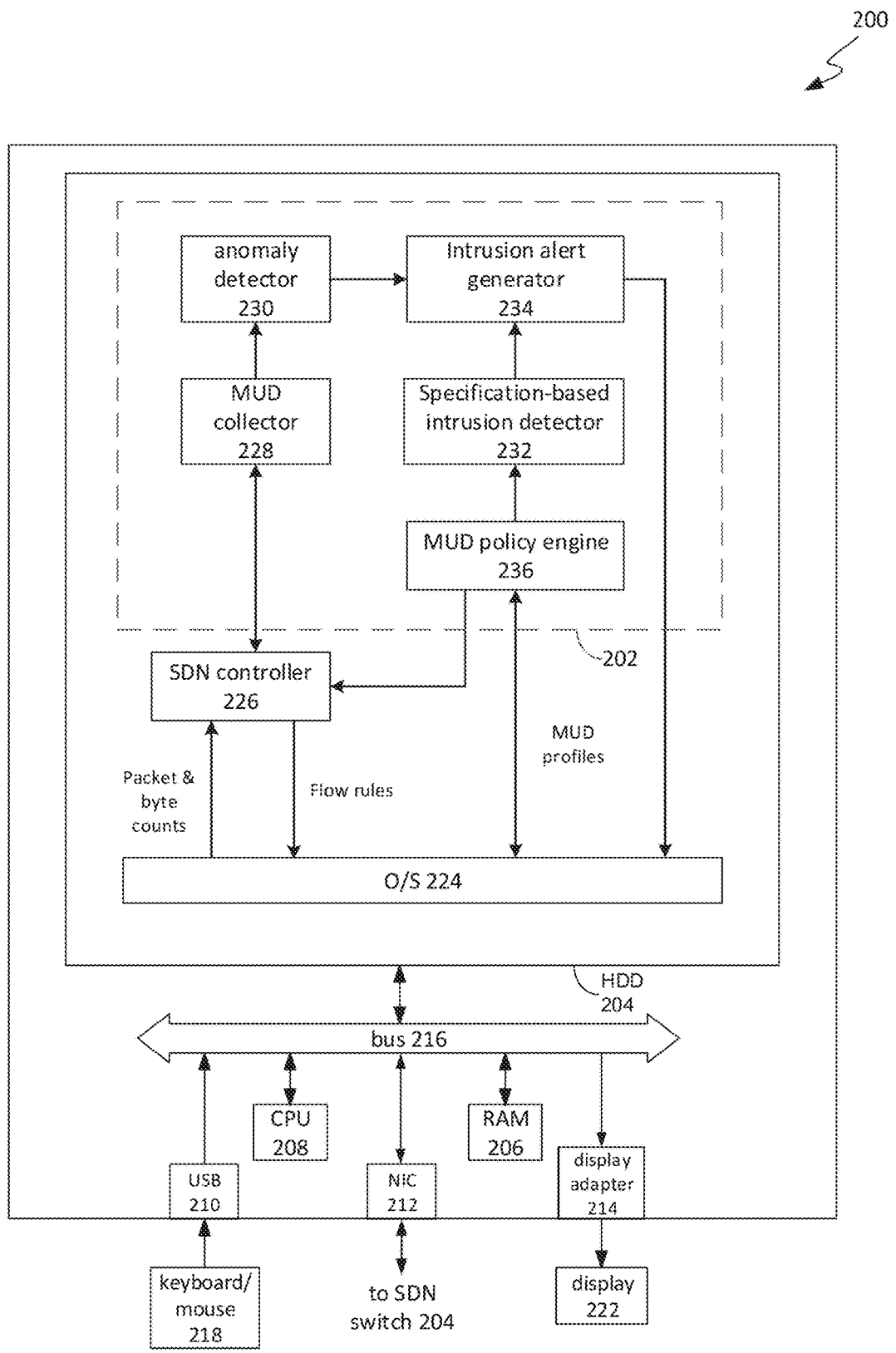
FIG. 2 is a block diagram of a network attack detection apparatus in accordance with some embodiments of the present invention.

FIG. 2 is a block diagram of a network attack detection apparatus 200 in accordance with an embodiment of the present invention, and FIG. 1 shows functional components of the apparatus 200 in the context of a typical home or enterprise network 202. IoT devices on the left can communicate with other devices on the local network 202 via a switch 204, and also with Internet servers (not shown) via a gateway 206.

In the described embodiments, the switch is an SDN switch 204 whose flow-table rules are managed dynamically by an external SDN controller 208. However, it will be apparent to those skilled in the art that other embodiments of the present invention may be implemented using other types of network switches to identify and quantify network traffic flows of networked devices.

Figure 3A:
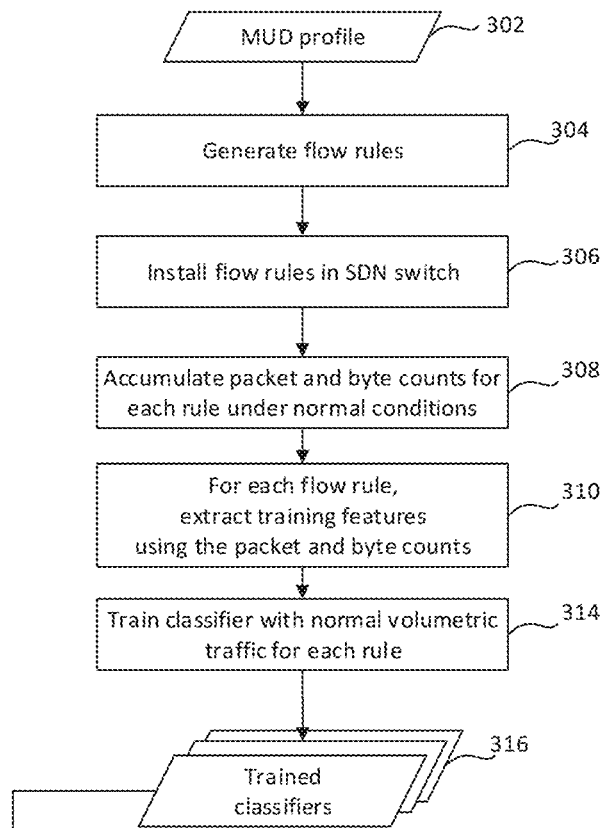
FIGS. 3A and 3B are flow diagrams of a network attack detection process in accordance with some embodiments of the present invention.
Figure 3B:
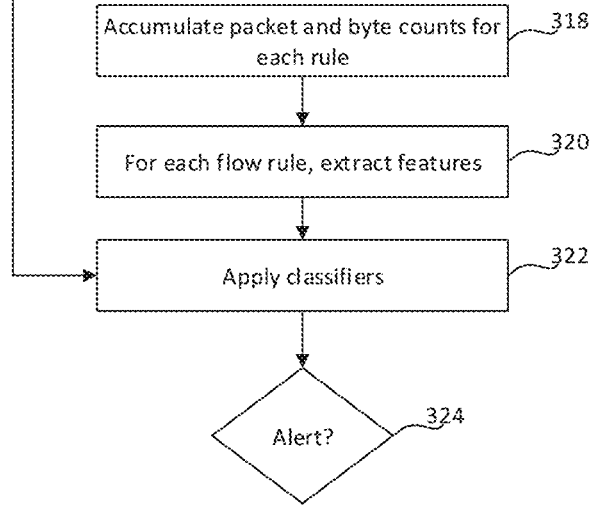

The network attack detection apparatus 200 executes a network attack detection apparatus process 300, as shown in FIGS. 3A and 3B, that compares the network traffic behaviour of each device in the network 202 to the expected network traffic behaviour of known IoT devices to identify at least some of the devices as instances of at least some of the known IoT devices, and to detect anomalous behaviour in those devices.

As shown in FIG. 2, in the described embodiments the network attack detection process 300 is implemented in the form of executable instructions of software components or modules 202 stored on at least one non-volatile storage medium such as a solid-state memory drive (SSD) or hard disk drive (HDD) 204 of a computing system, which in the described embodiments is a Dell PowerEdge R630 rack server. However, it will be apparent to those skilled in the art that at least parts of the process 300 can alternatively be implemented in other forms, for example as configuration data of a field-programmable gate array (FPGA), and/or one or more dedicated hardware components, such as application-specific integrated circuits (ASICs), or as any combination of any of these forms.

The network attack detection apparatus 200 includes random access memory (RAM) 206, at least one processor 208, and external interfaces 210, 212, 214, interconnected by at least one bus 216. The external interfaces include a network interface connector (NIC) 212 which connects the apparatus 200 to the SDN switch 204 network, and may include universal serial bus (USB) interfaces 210, at least one of which may be connected to a keyboard 218 and a pointing device such as a mouse 219, and a display adapter 214, which may be connected to a display device such as a panel display 222.

The network device management apparatus 200 also includes an operating system 224 such as Linux or Microsoft Windows, and an SDN controller 226 such as the Ryu framework, available from http://osrg.github.io/ryu/. Although the network device management components 202 and the SDN controller 226 are shown as being hosted on a single operating system 224 and hardware platform, it will be apparent to those skilled in the art that in other embodiments the SDN controller 226 may be hosted on a separate virtual machine or hardware platform with a separate operating system.

The network attack detection components 202 include a MUD collector 228, an Anomaly detector 230, a specification-based intrusion detector 232, an intrusion alert generator 234, a MUD policy engine 236, and an SDN "App" (not shown) that interacts with the MUD policy engine 236 to insert proactive flow entries (for ACEs with known endpoints), and reactive flow entries (based on run-time DNS bindings) into the SDN switch 204.

The App also interacts with the MUD collector 228 to periodically pull flow volume data in the form of flow counters from the SDN switch 204. The components 202 interact with each other to dynamically manage the flow-table rules inside the switch 204 whilst monitoring the network activity of various flows pertinent to each IoT device.

The SDN switch 204 does not redirect data packets to the SDN controller 226: rather, packets that need to be inspected are sent as copies on a separate interface of the switch, to which a software inspection engine is attached, as described below. This protects the SDN controller 204 from overload from the data-plane, allowing it to scale to high rates and to service other SDN applications. Moreover, since incoming data packets are sent onwards by the switch 204 immediately, the data-plane benefits in having minimal latency overhead, and is protected from failures of the SDN controller 204.

The operational flow of events in FIG. 1 is as follows: the SDN switch 204 is initially configured by a default rule, as shown by step 1, to mirror only those packets (on port-3), as shown by step 2, that reveal the device identity (e.g., DHCP), and all other packets are forwarded normally (on either port-1 or port-2 depending on whether the packet destination is in the local network 202 or the Internet). DHCP packets contain the MAC address of the requesting device, and will also provide a mud-url if the corresponding device manufacturer adopts the MUD standard. This assists the MUD policy engine to discover new IoT devices connected to the network—the MUD engine 236 keeps track of already discovered devices by maintaining a table of MAC/IP addresses of the discovered devices.

Thereafter, the MUD engine 236 fetches the corresponding MUD profile of the new IoT device from a MUD file server, as shown by step 3—The MUD engine 236 stores the retrieved profile until its validity period expires. In a real scenario, the MUD file server will be operated by the manufacturer who can update the device MUD profile when needed (e.g., due to a firmware upgrade).

The MUD policy engine 236 translates access control entries (ACEs) of the MUD profile into a corresponding set of flow rules (as described below). MUD specifications allow manufacturers to specify Internet endpoints by their domain-names in ACEs. These ACEs cannot be directly translated to flow rules, and need further inspection to infer DNS bindings. The MUD engine 236, therefore, inserts proactive flow entries, shown by step 4, for ACEs with known endpoints (i.e., static IPs), while others are reactively inserted based on run-time DNS bindings. An idle-timeout is set for reactive flow rules that are associated with a domain name, to account for dynamic DNS bindings.

Following insertion of the IoT device flow rules, the switch 204 mirrors all DNS responses in addition to exception packets that do not match on any proactive or reactive flow rule (i.e., default mirror of local and Internet traffic). These mirrored packets are inspected by a "specification-based intrusion detector" component of the MUD policy engine 236 to detect network traffic that does not conform to the MUD profile of the corresponding IoT device. The specification-based intrusion detector maintains an intermediate set of rules translated from the MUD profile, along with a DNS cache (all in memory) to determine whether headers of the mirrored packet match the intended profile of the corresponding IoT device. Once an exception packet is matched to a DNS cache entry, a corresponding reactive flow rule is added to the flow rules of the SDN switch 204.

Sophisticated attack traffic can still pass undetected using spoofing techniques so that the attack traffic conforms to the MUD profile(s) of the IoT device(s) under attack, and will therefore not be detected by the specification-based intrusion detector. In order to identify such 'volumetric' attack threats, the apparatus monitors the activity of all device flows specified by the MUD profile. To do so, the MUD collector 228 periodically pulls flow counters (denoted by step 5 in FIG. 1) from the switch 204, computes traffic volume attributes for each IoT device, and streams them to the corresponding anomaly detector for that IoT device, as denoted by step 6.

Anomaly Detection

A machine learning technique is used to determine whether an IoT device is involved in a volumetric attack ("attack detection"), and if it is, to identify each flow that contributes to the attack ("attack flow(s) identification"). The objective is to train the machine with a benign traffic profile of each device, and detect attacks by detecting deviations from the expected traffic pattern in device flows defined by the device MUD profile.

Device Flow Rules

As described above, a given MUD profile is processed to generate corresponding flow-table rules that are used to monitor the expected traffic of the device. For example, Table 1 below shows the set of flow rules generated from the MUD profile of a TP-Link smart plug IoT device. The highlighted rows (i.e., flow-IDs a.1, a.2, b.1 & b.2) correspond to a snapshot of reactive flow rules that may vary over time. Reactive rules have a priority that is slightly higher than the priority of flows mirroring Internet traffic. This prevents mirroring packets of Internet flows that conform to the MUD profile.

Domain-names for Internet source/destination are shown in Table 1 to make it easier to visualize (IP addresses are used in the actual flow-table). The un-highlighted rows correspond to proactive rules. Proactive rules f.2, g.1 & g.2, and k, respectively mirror: DNS replies, default Internet traffic from/to, and the local traffic to this device.

Only one direction of local traffic (i.e., to the IoT device) is used to avoid conflicting with matching flows of other devices. Mirroring traffic coming to the device allows the apparatus to inspect any attempt to access standard vulnerable services such as Telnet, SSH, or HTTP that might be open on IoT devices.

TABLE 1

Flow rules generated for a TP-Link Smart Plug IoT device

| W | sEth | dEth | typeEth | Source | Destination | proto | sPort | dPort | priority | action |
|---|---|---|---|---|---|---|---|---|---|---|
| a.1 | <gwMAC> | <devMAC> | 0x0800 | [ntp domain name] | * | 17 | 123 | * | 20 | forward |
| a.2 | <devMAC> | <gwMAC> | 0x0800 | * | [ntp domain names] | 17 | * | 123 | 20 | forward |
| b.1 | <gwMAC> | <devMAC> | 0x0800 | devs.tplinkcloud.com | * | 6 | 50443 | * | 20 | forward |
| b.2 | <devMAC> | <gwMAC> | 0x0800 | * | devs.tplinkcloud.com | 6 | * | 50443 | 20 | forward |
| c | <devMAC> | * | 0x0800 | * | * | * | * | * | 11 | forward |
| d.1 | <devMAC> | FF:FF:FF:FF:FF:FF | 0x888e | * | * | 17 | * | 67 | 11 | forward |
| d.2 | <gwMAC> | <devMAC> | 0x0800 | * | * | 17 | 67 | * | 11 | forward |
| e.1 | <gwMAC> | <devMAC> | 0x0800 | gateway IP | * | 1 | * | * | 11 | forward |
| e.2 | <devMAC> | <gwMAC> | 0x0800 | * | gateway IP | 1 | * | * | 11 | forward |
| f.1 | <devMAC> | <gwMAC> | 0x0800 | * | gateway IP | 17 | * | 53 | 11 | forward |
| f.2 | <gwMAC> | <devMAC> | 0x0800 | gateway IP | * | 17 | 53 | * | 11 | forward & mirror |
| g.1 | <devMAC> | <gwMAC> | 0x0800 | * | * | * | * | * | 10 | forward & mirror |
| g.2 | <gwMAC> | <devMAC> | 0x0800 | * | * | * | * | * | 10 | forward & mirror |
| h.1 | * | <devMAC> | 0x0806 | * | * | * | * | * | 7 | forward |
| h.2 | <devMAC> | * | 0x0806 | * | * | * | * | * | 7 | forward |
| i.1 | <devMAC> | * | 0x0800 | * | * | 6 | 9999 | * | 6 | forward |
| i.2 | * | <devMAC> | 0x0800 | * | * | 6 | * | 9999 | 6 | forward |
| j.1 | <devMAC> | * | 0x0800 | * | * | 1 | * | * | 6 | forward |
| j.2 | * | <devMAC> | 0x0800 | * | * | 1 | * | * | 6 | forward |
| k | * | <devMAC> | 0x0800 | * | * | * | * | * | 5 | forward & mirror |

Attack Detection Machines

Figure 5:
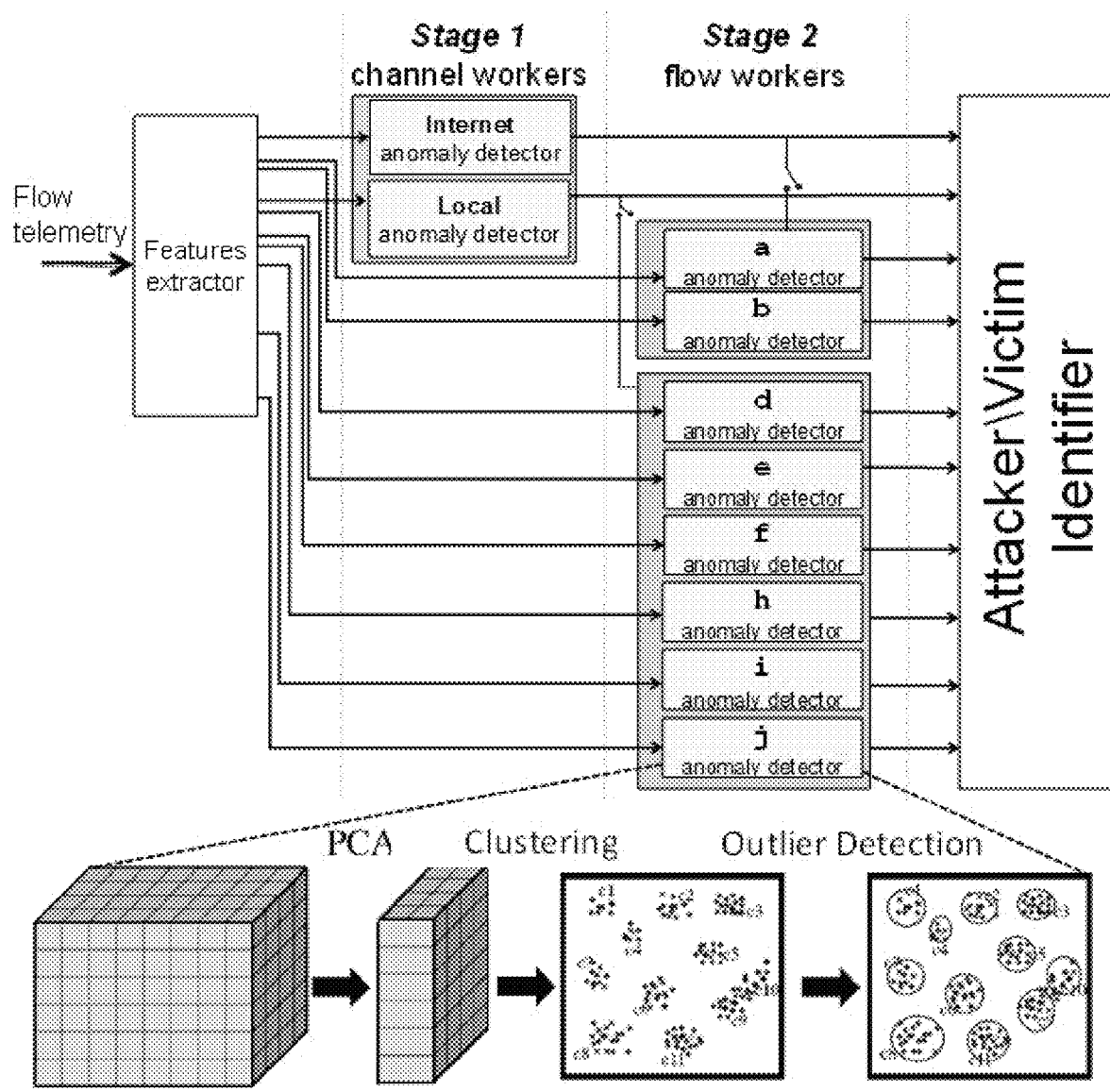
FIG. 5 is a schematic diagram showing machine learning components for detecting security attacks on the TP-Link smart plug IoT device.

The apparatus 200 use a two-stage process to detect traffic anomalies. For each IoT device, a specific machine is trained, based on the MUD profile of the IoT device. The process is not only able to detect an attack on the device, but also to identify the flow(s) contributing to the attack. For example, FIG. 5 depicts the machine structure specific to the TP-Link smart plug for detecting anomalies caused by volumetric attack traffic. The process first identifies whether an anomaly occurs over local or Internet communication using respective separate one-class device-specific classifiers referred to herein as 'channel detectors' or 'workers' (stage-1)—these workers utilize coarse-grained (device-level) telemetry. A true alarm from the stage-1 workers triggers corresponding one-class flow classifiers (also referred to herein as 'detectors/workers') at stage-2 which identify the flow(s) over which the attacker causes the anomaly using dedicated flow attack detectors/workers, each corresponding to a flow in Table 1—these workers utilize fine-grained (flow-level) telemetry.

Feature Extractor

Figure 6:
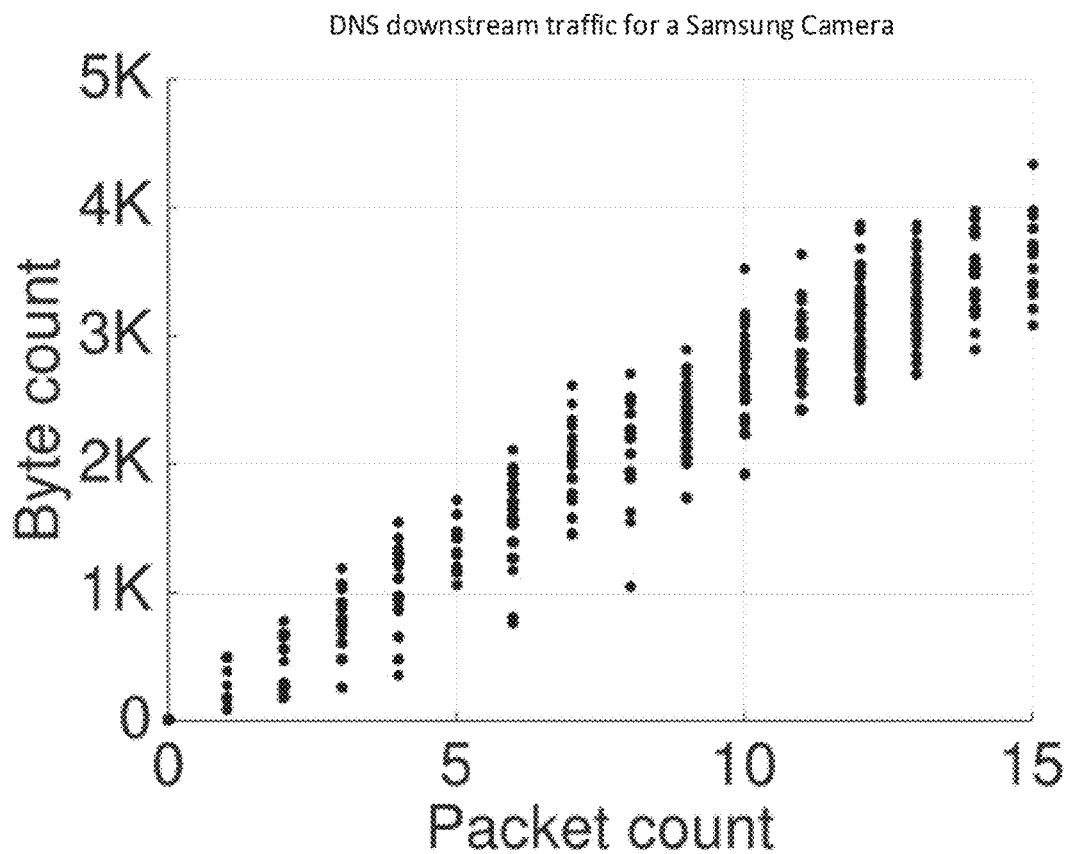
FIGS. 6 and 7 are graphs illustrating correlations between byte count and packet count for different types of network traffic packets to a Samsung Camera IoT device.
Figure 7:
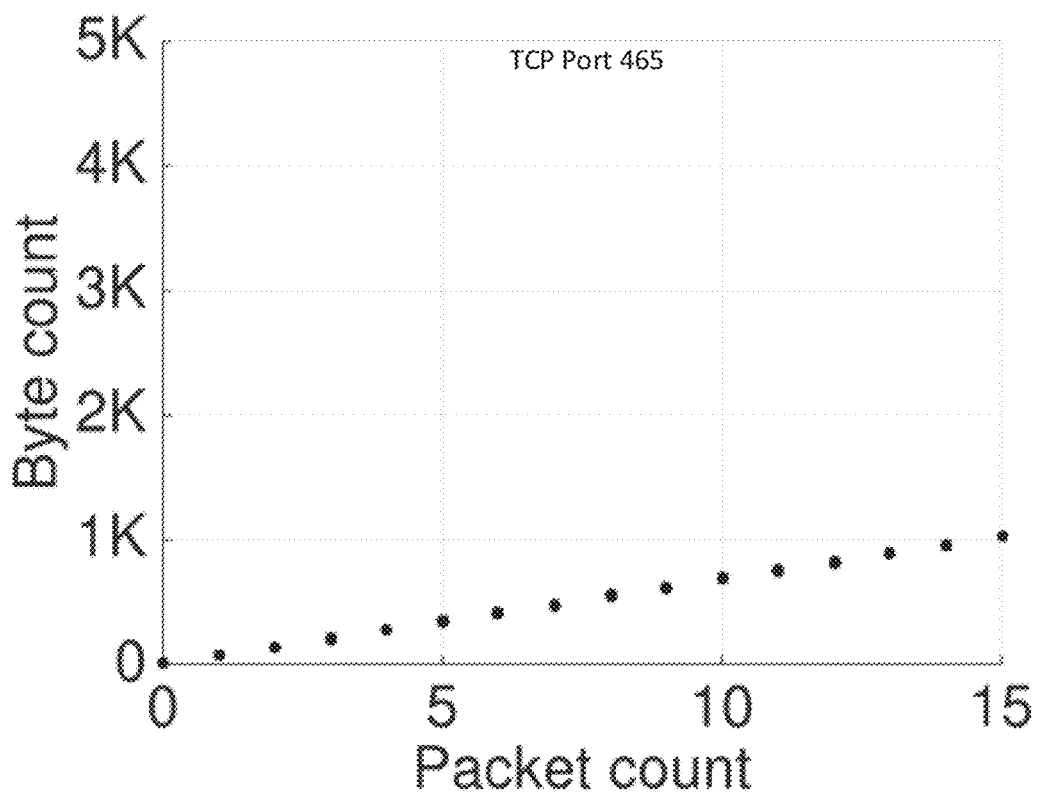

After generating flow rules for each IoT device (e.g., Table 1 for the TP-Link smart plug), corresponding features of benign network activity are then extracted, using the counts of packets and bytes provided by each flow rule as features. This is because the size of the packet can vary for a given protocol. For example, FIG. 6 shows a scatter plot of packet count versus byte count of DNS downstream traffic captured for a Samsung camera over one month in the inventors' lab. For a given packet count, the byte count varies over a range of 1 KB or more, indicating that packet count and byte count are not highly correlated. However, for TCP Port 465 downstream traffic for the same device, shown in FIG. 7, packet count and byte count are highly correlated (indicating a consistent packet size).

Traffic features are also generated for multiple time-scales by retrieving flow counters (packet and byte counts) every minute and processing the counter values to generate values for the totals, means, and standard-deviations of packet and byte counts over sliding windows of, in the described embodiment, 2-, and 3-minutes as features, and including the original byte and packet count values as an additional two features, providing a total of 14 features (also referred to herein as attributes) for each flow rule at any point in time. It will be apparent to those skilled in the art that other sliding windows, features, and combinations thereof may be used in other embodiments.

The stage-1 detectors use these 14 attributes of a set of flows that share the channel specified by the MUD profile (i.e., local or Internet). Each stage-2 detector corresponds to a bidirectional traffic flow (i.e., a pair of flow rules to/from the device). For example, machine "a" of stage 2 in FIG. 5 uses the features of the two flows a.1 and a.2 from Table 1.

There can be multiple reactive rules for an Internet flow due to dynamic DNS bindings. Therefore, these rules are aggregated by wild-carding the Internet endpoint. It is also important to note that default rules (i.e., g.1, g.2, and k) are not considered for anomaly detection, because they are handled by the specification-based intrusion detector.

Anomaly Detection Workers

The anomaly detection workers (both in stage-1 and stage-2) are based on the concept of one-class classification: device workers are trained by features of benign traffic of their corresponding IoT device, and are able to detect whether a traffic observation belongs to the trained class or not. Each anomaly detector uses a clustering-based outlier detection algorithm comprising three steps, as shown schematically at the bottom of FIG. 5, namely: (i) Principal Component Analysis (PCA), (ii) clustering, and (iii) boundary detection.

Principal Component Analysis (PCA): if, for example, an IoT device has 17 flow rules, then it would give rise to 238 features in total (each flow contributing to 14 features). This makes it computationally expensive to analyze such a large number of features. However, some features are highly correlated (e.g., FIG. 7) and can be transformed to reduce the feature space dimension.

Accordingly, the apparatuses and processes described herein use PCA to determine the principal components of the extracted features that are orthogonal to each other. The Kaiser rule is used to deduce and select the most suitable set of principal components that capture all of the variance in the dataset. As per the PCA requirement, all features are normalized using the z-scores method (i.e., they are expressed as deviations from the mean divided by the standard deviation).

Clustering: As discussed above, multiple anomaly detection workers are used for each IoT device, and an efficient and computationally inexpensive clustering algorithm is needed that (a) can set the clustering parameters automatically (i.e., self-tuned), and (b) is able to deal with the benign traffic dataset that contains a mixture of sparse and dense regions. Among many possible clustering algorithms, the described embodiments use the "X-means" method (a variant of the K-means algorithm), which is a fairly lightweight yet efficient clustering method know to those skilled in the art. The accuracy of high dimensional data clustering depends on the distance function used, and the inventors found that the Manhattan distance function known to those skilled in the art provides the best results in the described context. Finally, the X-means clustering algorithm is trained with the principal components of the training dataset (obtained from PCA), providing as output the coordinates of the cluster heads, as shown by the brighter dots labeled by $c_i$ in FIG. 5.

Boundary Detection: An anomaly is detected when an observation deviates from the clusters representing benign network traffic. Given the cluster heads and the training dataset, the 95th percentile is calculated as a boundary for each cluster, and anomalies observed outside these boundaries trigger an alarm (which is therefore expected to cause occasional mis-detections of benign traffic as anomalous (i.e., false positive alarms)).

EXAMPLE

Attack Types and Scenarios: to demonstrate the performance of the apparatuses and processes described herein, two types of attacks were used, namely: (a) direct attacks, and (b) reflection/reflective attacks. The direct attacks included ARP spoofing, TCP SYN flooding, Fraggle (UDP flooding), and Ping of Death. The reflective attacks included SNMP, SSDP, TCP SYN, and Smurf. As depicted in Table 3 below, various types of attacks were launched at three different rates, namely: low: 1 packet-per-second (pps), medium: 10 pps, and high: 100 pps, and with diversity of location for both attackers and victims being either from Internet ("I") or local ("L"). All of these attacks were sustained for a duration of 10 minutes.

TABLE 2

List of attacks launched against testbed IoT devices. (L: local, d: device, I: Internet)

| | | Maximum packet rate | | | Device label | | | | Attack scenario | | | | |
|---|---|---|---|---|---|---|---|---|---|---|---|---|---|
| | Attacks | 1 pps | 10 pps | 100 pps | WM | WS | SC | TP | NC | L→d | L→d→L | L→d→I | I→d→I | I→d |
| Reflection | SNMP | ✓ | ✓ | ✓ | | | ✓ | | | ✓ | ✓ | ✓ | | |
| | SSDP | ✓ | ✓ | ✓ | ✓ | | | | | ✓ | ✓ | ✓ | | |
| | TCP SYN | ✓ | ✓ | ✓ | ✓ | ✓ | ✓ | ✓ | ✓ | ✓ | | ✓ | | |
| | Smurf | ✓ | ✓ | ✓ | | ✓ | ✓ | | | ✓ | | | | |
| Direct | TCP SYN | ✓ | ✓ | ✓ | | ✓ | ✓ | ✓ | ✓ ✓ | | | | | ✓ |
| | Fraggle | ✓ | ✓ | ✓ | | ✓ | | | | | | | | ✓ |
| | Fraggle | ✓ | ✓ | ✓ | ✓ | ✓ | | | | | | | | ✓ |
| | Ping of Death | ✓ | ✓ | ✓ | ✓ | ✓ | ✓ | ✓ | ✓ | | | | | |
| | ARP Spoof | ✓ | ✓ | ✓ | ✓ | ✓ | ✓ | ✓ | ✓ ✓ | | | | | |

These specific attacks were designed to show how different rates of attack impact the traffic for the various protocols (including ARP, TCP, UDP, and ICMP). The intention was to launch attacks (to the device or Internet servers) without being detected by the specification-based intrusion detector, meaning that they conform to the IoT device MUD profiles. Furthermore, these attacks were sourced from within the local network as well as from the Internet. For the Internet sourced attacks, port forwarding was enabled on the gateway (emulating malware behaviour). For local attacks, IP and port spoofing were employed, and the Internet attacks employed DNS spoofing followed by IP and port spoofing.

Attack Simulation Tool: a modular tool was written in Python to provide a suite of attacks specific to several real consumer IoT devices that are currently available on the market. The tool automatically identifies vulnerabilities of a device (SSDP, SNMP, exposed ports, weak encryption or unencrypted communication) by launching various tests against the device on the local network. Once the device's vulnerabilities are identified, the tool then launches pertinent attacks. During the attacks, the tool generates appropriate annotations including the victim device's IP address, the attacker host information, start-time, end-time, bitrate, attack protocol, and attack port number.

Figure 8:
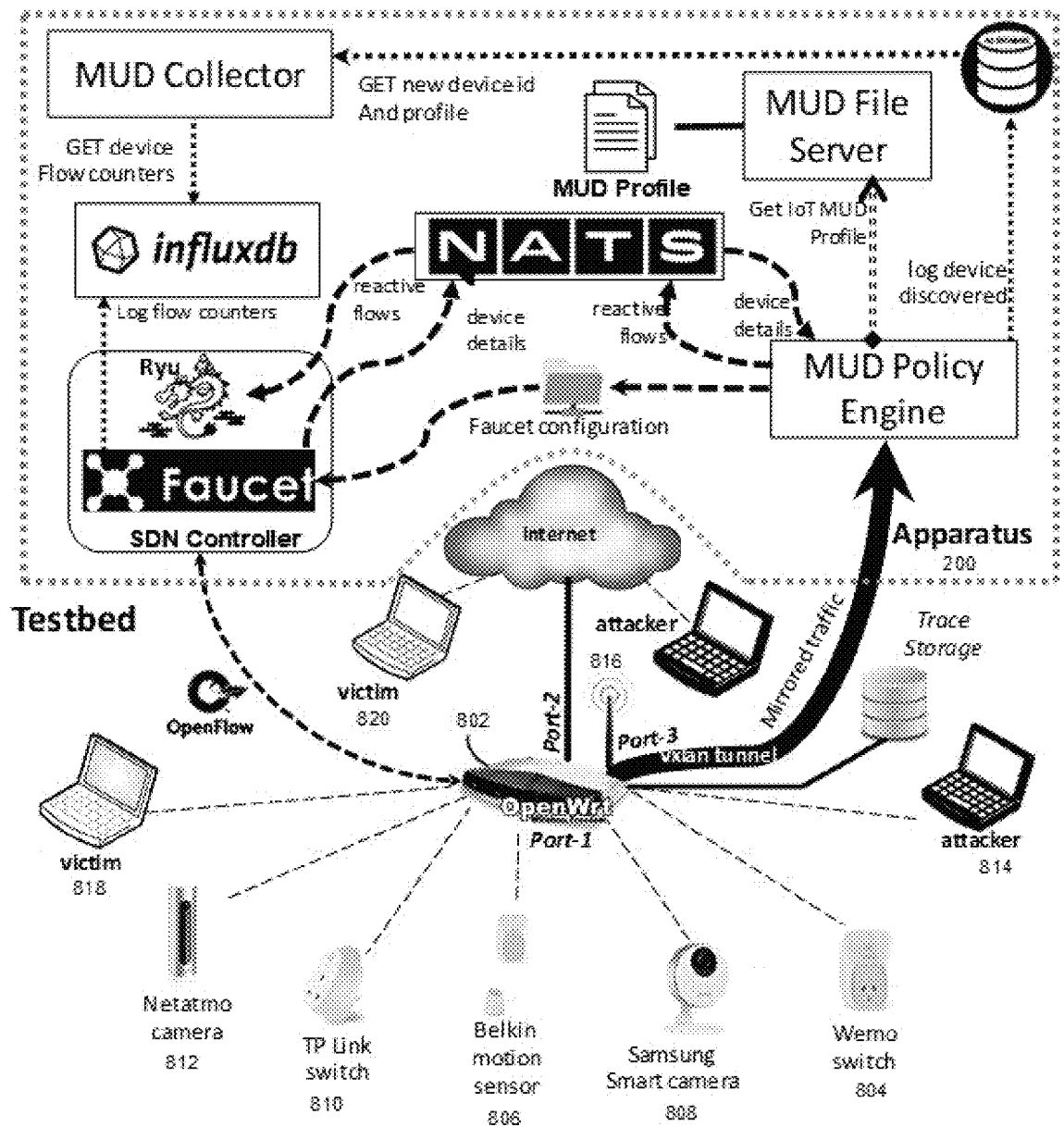
FIG. 8 is a schematic diagram of a testbed network that was used to evaluate the performance of the apparatus, including data collection components of a network attack detection apparatus in accordance with one embodiment of the present invention.

Testbed: The lower part of FIG. 8 illustrates the testbed that was used to evaluate the performance of the described apparatus and process, including a TPLink gateway 802 with OpenWrt firmware that serves a number of IoT devices, including a WeMo switch 804, a WeMo motion sensor 806, a Samsung smart-camera 808, a TP-Link smart plug 810 and a Netatmo camera 812. Two attackers 814, 816 were included, locally (inside LAN) 814 and remotely (on the Internet) 816 with two victims 818, 820, both attackers 814, 816 being able to attack both victims 818, 820.

A 1 TB external hard disk (not shown) was connected to the gateway 802 to store packet traces (i.e., pcap files) of all network traffic (i.e., locally and remotely) using the tcpdump tool. Packet traces of benign and attack traffic from the testbed were collected for a period of 16 days. Given the known attackers and victims, it was easy to annotate the attack traffic in the dataset, as shown in Table 2 below. Interestingly, the dataset revealed the presence of other attacks launched from the Internet (i.e., wild attacks) when port forwarding was enabled.

Dataset:

Two datasets were collected, namely raw packet traces and derived flow counters. The derived dataset contains counters of flows (computed over a minute) for the 5 IoT devices listed in Table 2 below.

TABLE 3

Summary of benign and attack datasets

| Device | No of training instances (min) | No of testing instances (min) | No of attack instances | Device label |
|---|---|---|---|---|
| WeMo motion | 5000 | 17420 | 300 | WM |
| WeMo switch | 5000 | 17420 | 180 | WS |
| Samsung smartcam | 5000 | 17420 | 357 | SC |
| TP-link smart plug | 5000 | 17420 | 178 | TP |
| Netatmo camera | 5000 | 17420 | 147 | NC |

The second column shows the number of training instances (i.e., count of packets and bytes per flow rule per minute) for each device. The training instances only contained benign traffic. For the testing phase, 17420 instances were collected for each device, containing both benign and attack traffic. Out of these many testing instances, the number of attack instances is shown in the fourth column for the corresponding IoT device under attack.

The upper part of FIG. 8 shows data collection components of an embodiment of the network attack detection apparatus that was used with the testbed to collect network data for subsequent (offline) attack detection. The data collection components include an application on top of the open source Ryu, and Faucet/Gauge SDN controllers, the MUD policy engine, the MUD collector, and the open source NATS messaging system and InfluxDB and h2 database engines. Each of these components operates on a separate docker container over an Ubuntu 16.04 server. In addition, the MUD file server is a repository of MUD profiles that runs as an HTTP server on a separate VM in the University of New South Wales cloud network.

SDN Controllers and Application:

The network attack detection apparatus of FIG. 8 includes the open-source SDN controllers Faucet, Gauge and Ryu: Faucet is used for inserting proactive flows via its configuration file, Ryu is used for inserting reactive flows that are dynamic with idle-timeout (60 minutes), and Gauge is used for collecting flows counters. The configuration file of Faucet consists of a set of access controls that is generated/augmented by the MUD policy engine (described below).

Ryu exposes a REST API for insertion of reactive flows which is convenient to use, but it allows any application to manipulate all flow tables that can cause conflict, noting that both Faucet and Ryu SDN controllers manipulate the flow-table. To address this issue, a Python application (not shown) was developed in Ryu to subscribe to a specific channel of the NATS open source messaging system broker, listening for reactive flow messages, and enforcing them into table-0 with high priority (15000 in the described embodiment) inside the switch 802. A second application (not shown) listens to the Faucet Unix data-stream, retrieves newly discovered device details (including the device MAC, the switch dpid, and the VLAN id), and publishes them using NATS—the MUD engine listens to this channel. The Gauge SDN controller component is configured to collect flow counters every minute from the switch 802, and thereafter write them into an InfluxDB time-series database.

SDN Switch:

OpenWrt firmware (v18.06) and OVS (v2.8.2) (Open vSwitch, an open source virtual switch) were installed on a TP-Link Archer C7 gateway to provide the SDN switch 802 and default gateway. The switch 802 is configured with three OpenFlow controllers. A VX-LAN tunnel interface was created between the switch and the MUD policy engine to mirror selected packets that require further inspection, as described below.

MUD Policy Engine:

In the described embodiment, the MUD policy engine is implemented as a Java application to inspect incoming packets from the VX-LAN tunnel interface. An asynchronous and non-blocking packet listener was implemented using netty. The MUD policy engine is responsible for various tasks, including generating/augmenting the Faucet configuration file (based on the device MUD profile) upon discovery of a new IoT device, publishing reactive flow rules based on run-time DNS bindings, and detecting MUD non-compliant traffic (in the described embodiment, the specification-based intrusion detector is a component of the MUD policy engine, although that need not be the case in other embodiments).

The Faucet configuration directory is shared by both the Faucet controller and the MUD engine. Three hierarchical levels of configuration file were developed: (a) switch configuration (i.e., faucet.yaml)—this configuration file contains a default access control rule for each port of the switch, mirroring all DHCP packets to the MUD policy engine, and is generated manually by the network admin who has prior knowledge of the switch, ports, and VLANs, (b) VLAN configuration (e.g., switch-mac.yaml) that lists all devices against each VLAN—in the testbed all devices belong to one VLAN for simplicity, and (c) device configuration (e.g., device-mac.yaml) that lists ACEs for a given device, as described above. Once the Faucet configuration file is updated, the MUD policy engine writes the IoT device MAC and its MUD profile into an h2 database, informing the MUD collector about the newly connected IoT device, thus enabling it to compute required features for the new IoT device.

MUD Collector:

The MUD collector periodically (every minute) polls the h2 database to check whether a new IoT device is discovered, if so then the device MUD profile is fetched and interpreted to identify the required features of that specific device. Thereafter, the collector polls (every minute) the InfluxDB for the device flow counters, computes the features, and writes the features into a device-specific CSV file. These features were replayed into the anomaly detectors.

Anomaly Detector:

The attack detection application was developed using the open source R and Weka tools. The PCA library was available in R, and therefore the boundary detection was also implemented in R. The X-means package of Weka was employed for clustering, and the RWeka extension of R was used to interface with Weka. The CSV outputs of the MUD collector were replayed (streamed) into the anomaly detection application, and an attack annotation log was then correlated with the result of the anomaly detection to compute the attack detection performance.

Attack Detection

TABLE 4

Anomaly Detector Performance

| Anomaly detectors | All devices | | | WM | | WS | |
|---|---|---|---|---|---|---|---|
| | Accuracy(%) | TPR(%) | FPR(%) | TPR(%) | FPR(%) | TPR(%) | FPR(%) |
| Stage-1 and Stage-2 combined | 96.66 | 88.42 | 3.22 | 95.67 | 3.8 | 95 | 3.31 |
| Only Stage-2 detector | 91.4 | 90.52 | 8.52 | 96 | 10.66 | 95 | 6.02 |
| Only Stage-1 detector | 86.42 | 92 | 13.65 | 98.33 | 41.59 | 95 | 7.46 |
| Only Local detector | 95.09 | 85.06 | 4.82 | 87.62 | 6.23 | 95 | 6.24 |
| Only Internet detector | 90.15 | 92.2 | 9.85 | 97.5 | 37.74 | 93.33 | 2.11 |

| Anomaly detectors | SC | | TP | | NC | |
|---|---|---|---|---|---|---|
| | TPR(%) | FPR(%) | TPR(%) | FPR(%) | TPR(%) | FPR(%) |
| Stage-1 and Stage-2 combined | 79.83 | 3.06 | 96.15 | 1.83 | 75.51 | 4.11 |
| Only Stage-2 detector | 85.43 | 14.83 | 96.15 | 3.7 | 78.23 | 7.64 |
| Only Stage-1 detector | 85.15 | 6.27 | 96.15 | 3.84 | 87.75 | 9.24 |
| Only Local detector | 94 | 1.4 | 95.97 | 3.22 | 94.25 | 3.16 |
| Only Internet detector | 67.51 | 5.27 | 94.92 | 1.1 | 73.33 | 6.99 |

Table 4 shows the performance of the attack detector when considering IoT devices collectively and individually. Each row shows the performance results for various combinations of the anomaly detectors shown in FIG. 5.

TABLE 5

Detected attacks for individual devices. (L: local, d: device, I: Internet)

| Attack type | Attack scenario | WM | | | WS | | | SC |
|---|---|---|---|---|---|---|---|---|
| | | Launched | Detected | Identified | Launched | Detected | Identified | Launched |
| TCP SYN reflection | L→d→L | 30 | 30 | 21 | 30 | 27 | 27 | 30 |
| TCP SYN reflection | I→d→I | 30 | 28 | 28 | 30 | 29 | 28 | 30 |
| SSDP reflection | L→d→L | 30 | 26 | 12 | | | | |
| SSDP reflection | I→d→I | 30 | 29 | 29 | | | | |
| SSDP reflection | L→d→I | 30 | 29 | 29 | | | | |
| SNMP reflection | L→d→L | | | | | | | 27 |
| SNMP reflection | I→d→I | | | | | | | 30 |
| SNMP reflection | L→d→I | | | | | | | 30 |
| Smurf | L→d→L | | | | | | | 30 |
| Fraggle | L→d | 30 | 29 | 29 | | | | 30 |
| Fraggle | I→d | | | | | | | 30 |
| TCP SYN | L→d | 30 | 30 | 20 | 30 | 29 | 29 | 30 |
| TCP SYN | I→d | 30 | 29 | 28 | 30 | 28 | 28 | 30 |
| Arp Spoof | L→d | 30 | 29 | 29 | 30 | 28 | 28 | 30 |
| Ping of death | L→d | 30 | 28 | 28 | 30 | 30 | 30 | 30 |

| Attack type | SC | | TP | | | NC | | |
|---|---|---|---|---|---|---|---|---|
| | Detected | Identified | Launched | Detected | Identified | Launched | Detected | Identified |
| TCP SYN reflection | 28 | 28 | 29 | 28 | 28 | 30 | 28 | 28 |
| TCP SYN reflection | 21 | 19 | 30 | 29 | 29 | 30 | 17 | 16 |
| SSDP reflection | | | | | | | | |
| SSDP reflection | | | | | | | | |
| SSDP reflection | | | | | | | | |
| SNMP reflection | 2 | 0 | | | | | | |
| SNMP reflection | 28 | 28 | | | | | | |

TABLE 5-continued

Detected attacks for individual devices. (L: local, d: device, I: Internet)

| | | | | | | | | |
|---|---|---|---|---|---|---|---|---|
| SNMP reflection | 29 | 29 | | | | | | |
| Smurf | 27 | 27 | 30 | 27 | 27 | | | |
| Fraggle | 21 | 21 | | | | | | |
| Fraggle | 29 | 29 | | | | | | |
| TCP SYN | 29 | 29 | 30 | 30 | 30 | 30 | 28 | 28 |
| TCP SYN | 22 | 18 | 29 | 28 | 27 | 30 | 13 | 10 |
| Arp Spoof | 20 | 19 | 30 | 28 | 28 | 27 | 25 | 25 |
| Ping of death | 29 | 29 | 30 | 30 | 30 | | | |

Accuracy and False-Positive Rate:

Focusing on the aggregate of all devices in Table 4, it is seen that the combination of stage-1 and stage-2 workers gives the highest accuracy of 96.66% (i.e., the percentage of correctly classified benign and attack instances). The apparatus and process are able to detect 88.42% of all attacks (TPR: true positive rate) across all IoT devices when two-stage anomaly detection is employed. As expected, in this situation the lowest false positive rate (i.e., FPR 3.22%) is achieved. This is a key advantage of the described process compared to other anomaly detectors that generally suffer from high false positive rates. Unsurprisingly, when workers of only stage-1 or stage-2 are used, the overall accuracy drops. It was found that stage-2 workers perform slightly better than stage-1 workers, however in terms of functionality both have separate purposes. Stage-1 deals with coarse-grained device-level activity, whereas stage-2 deals with fine-grained flow-level activity. Accordingly, the combination of both stages provides better accuracy and fewer false-positive detections.

Considering per-device performance of anomaly detection, the bottom two rows in Table 4 show performance when local and Internet attacks are separately considered. For the local detector, the lowest true positive rate (i.e., TPR 87.62%) is achieved for the Wemo motion sensor (i.e., device label "WM"). It was found that some of the reflection attacks originating from a local attacker to an external victim (i.e., L→d→I) are missed by this worker, meaning that local traffic features are not impacted sufficiently to raise an attack alarm. However, these reflection attack instances are detected by the Internet classifier/detector. Similarly, it was found that the Internet classifier/detector for the Netatmo camera (i.e., device label "NC") suffers from a fairly low TPR of 73.33% —low rate attacks (i.e., 1 pps and 10 pps) were not detected.

Overall, the apparatus successfully detected all types of high-rate (i.e., 100 pps) attacks. For low-rate (i.e., 1 pps) attacks, the apparatus missed 5 out of 40 types of attacks.

Another interesting observation is that for the stage-1 (device-level traffic) detector of the WeMo motion (i.e., device "WM"), the false positive incidence is very high (41.59%); however, when combined with the stage-2 (flow-level traffic) detector, the false positives drop to 3.8%. This shows that the coarse-grained behaviour (i.e., aggregate of flows) of this device was not fully learned by the training dataset, but the flow-level behaviour was well captured and learned.

Detecting Various Attack Types:

Table 5 shows the number of detected attack instances for each IoT device per attack type—each instance represents a one minute period of traffic. For example, in the first row, 30 instances of TCP SYN remote reflection attacks (i.e., L→d→L) were launched to the "WM" device, and the anomaly detection machine was able to detect all of these 30 attacks just one minute after their commencement. The results shown in Table 5 highlight the fact that the process is able to detect volumetric attacks of all types during their lifetime (i.e., 10 minutes or more), except for SNMP reflection type attacks (L→d→L) on the Samsung smartcam (i.e., device "SC").

It is noted that the process might not detect certain types of reflection attacks within the local network (i.e., L→d→L), namely those that are broadcast with the source address spoofed as a local victim. For this specific type, the original attack traffic does not match on any device-specific flow rule because the process only captures incoming traffic for the local network (as described above). But the reflected traffic may contribute to one of the device flows. For example, it was found that the local SSDP reflection attack on the WeMo motion detector device was detected because the reflected packets happened to match one flow of the WeMo motion. But if the victim is an IoT device, even the local broadcast reflection attack will be detected.

There is also a low detection, shown by bold text under columns "Detected" in Table 5, for TCP SYN reflection (I→d→I), Fraggle (L→d), SNMP reflection (L→d→L), TCP SYN (L→d), and ARP spoof in the Samsung smart camera (i.e., device "SC") flows, and TCP SYN reflection (I→d→I) and TCP SYN (L→d) in the Netatmo camera flows (i.e., device "NC"). It is emphasized that these undetected attack instances were for low-rate traffic (each one minute) from a 10-minute duration of an attack. This indicates that low-rate attacks are difficult to detect, but the detection process is able to detect them if their duration is long, which is typically the intention of the attacker. In other words, all of the attacks, except the SNMP local reflection for Samsung camera, were ultimately detected (i.e., on average after 1.48 minutes from the attack commencement).

Figure 9:
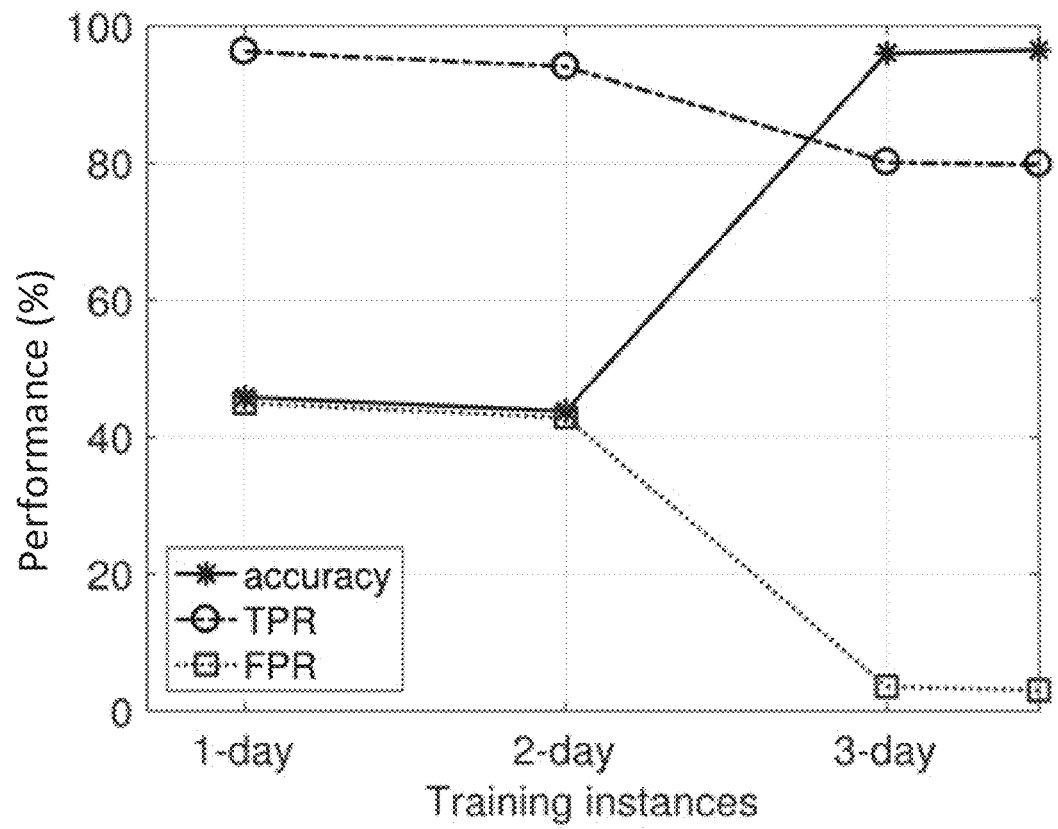
FIG. 9 is a graph illustrating the relationship between attack detection performance and the amount of training instances used to train classifiers of the apparatus.

Impact of Training on Performance: The accuracy of attack detection highly depends on the benign states that are learned during the training phase. FIG. 9 shows that the overall accuracy for the Samsung camera is less than 50% when the machine is trained by only 2-days of training data, but steeply rises to 96.08% when machines are trained with one additional day of training instances that include new benign (expected) states. In contrast, the TPR rate is consistently high (i.e., above 80%) because all attack instances (including low rate ones) deviate from even limited numbers of trained states. Therefore, it is important to capture all benign states (i.e., normal traffic) of each device during the training phase. It is challenging to determine the minimum amount of training data (in terms of the number of days) for building a reasonably well-trained model.

TABLE 6

Identified malicious flow for TP-Link smart plug under attack

| Attack type | Attack scenario | Launched | Detected | Malicious flow | a | b | c | d | e | f | h | i | j |
|---|---|---|---|---|---|---|---|---|---|---|---|---|---|
| TCP SYN reflection | L→d→L | 29 | 28 | i | 0 | 1 | 0 | 0 | 0 | 0 | 24 | 28 | 0 |
| TCP SYN reflection | I→d→I | 30 | 29 | b | 0 | 29 | 0 | 0 | 0 | 3 | 3 | 0 | 3 |
| Smurf | L→d→L | 30 | 27 | j | 0 | 0 | 0 | 0 | 0 | 0 | 13 | 0 | 27 |
| TCP SYN | L→d | 30 | 30 | i | 0 | 0 | 0 | 0 | 0 | 0 | 26 | 30 | 0 |
| TCP SYN | I→d | 29 | 28 | b | 0 | 27 | 0 | 0 | 0 | 0 | 0 | 0 | 0 |
| Ping of death | L→d | 30 | 30 | e | 0 | 0 | 0 | 0 | 30 | 0 | 20 | 0 | 0 |
| ARP spoof | L→d | 30 | 28 | h | 0 | 0 | 0 | 0 | 0 | 16 | 28 | 0 | 9 |

Attack Flow Identification

The performance of the process in identifying attack flows is also shown in Table 5, in which the "Identified" column under each device shows the number of attack instances in which the contributing flow was correctly identified. It can be seen in the first row of Table 5 that for TCP SYN local reflection attacks (L→d→L), there were 30 attack instances launched on the WeMo motion device, of which all 30 instances were detected, but only in 21 of those was the attack flow identified correctly. In the remaining 9 instances, only the ARP flow was flagged—however, the attack was not launched over ARP. It was found that the ARP anomaly worker is sensitive to (i.e., raises alarms for) most local attacks, highlighted by bold text under column "Identified" under the WeMo motion ("WM") heading in Table 5, while the actual contributing flow was not identified for some instances. In the case of the Fraggle and Ping-of-death attacks, the corresponding attack flow was correctly flagged by the worker, although the ARP worker once again incorrectly flagged the ARP flow.

Figure 10:
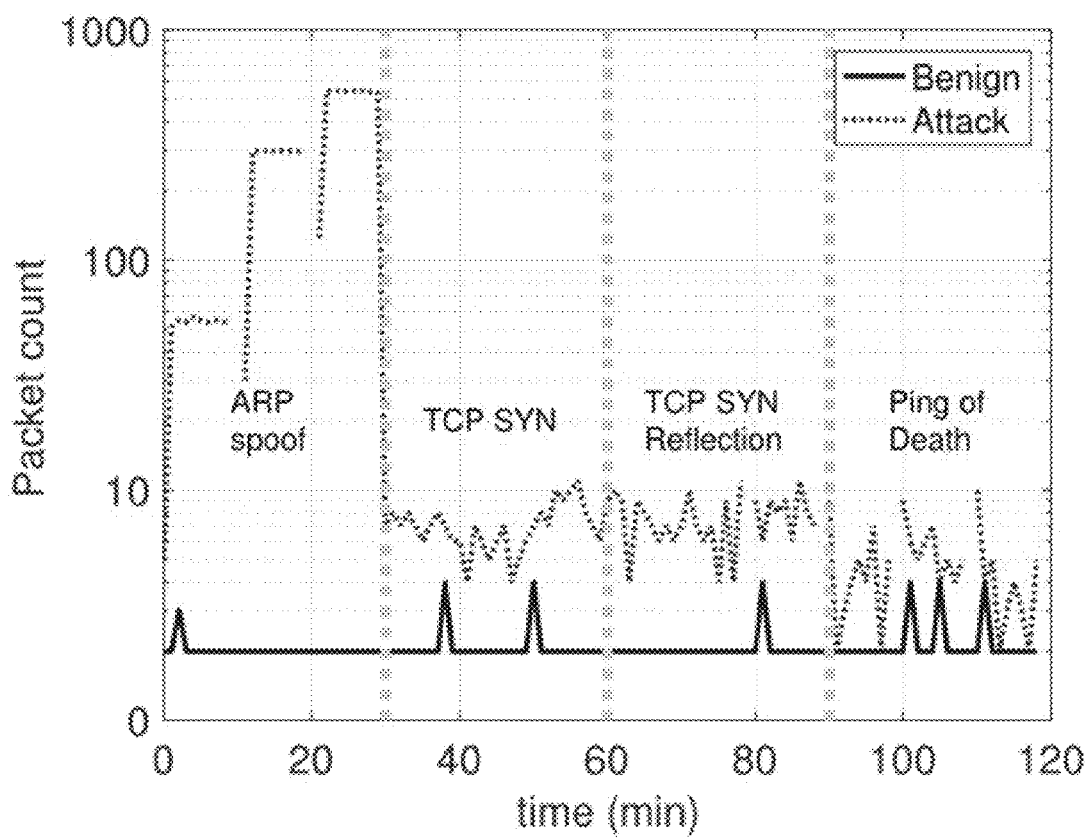
FIG. 10 is a graph of packet count as a function of time for an attack simulator implementing different types of security attacks, and showing benign device traffic for comparison.

Correctness of Flow Alarms:

The performance of individual flow classifiers/workers (i.e., in the stage-2 anomaly detectors) can be seen in Table 6, which lists detected attacks and corresponding flows identified for the TP-Link smart plug device. The "Malicious Flow" column shows the flow (from Table 1) used in the attack. The TCP SYN reflection (L→d→L) attack used TCP port 9999 (flow i). It is seen that 28 out of 29 attack instances were correctly detected, and all true alarms flagged the correct flow i, although ARP flow (i.e., flow h) was also (incorrectly) flagged in 24 alarms. Such a high rate of incorrect ARP alarms was also seen for local TCP Smurf, SYN, and Ping-of-Death attacks, shown under column "h". In order to better understand the reason for the false-positive ARP alarms, FIG. 10 shows the time profiles of an ARP flow in benign (shown by solid line) versus local attack (shown by dashed line) traffic from the training dataset. It is clearly seen that that the ARP profile during an attack clearly deviates from its normal profile, even for attacks that are not directly related to this flow. It is noted that, during Internet attacks, the device ARP profile is not impacted significantly to raise alarms.

Another interesting observation is that, when the ARP spoofing attack is launched (the last row in Table 6), there were 16 and 9 alarms, respectively, for DNS (flow f) and local ICMP (flow j). The ARP spoof causes all victim traffic to be redirected to the attacker (instead of the expected gateway). Since the TP-Link smart plug device was communicating ICMP and DNS packets during the ARP spoof attack, and as a result the anomaly was detected by the corresponding ICMP and DNS flow workers.

These observations can help to determine a weight for individual workers when identifying attack flow(s). For example, if ARP and local TCP port 80 workers flag an anomaly simultaneously, then it is worth investigating bidirectional TCP flows to/from port 80—deprioritizing alarms from the ARP worker.

TABLE 7 measured throughput of packet inspector for various IoT devices

| IoT device | Total number of packets | Number of inspected packets |
|---|---|---|
| WeMo motion | 7,219,407 | 116,759 (1.61%) |
| WeMo switch | 401,102 | 455 (0.11%) |
| Samsung smartcam | 1,172,199 | 908 (0.07%) |
| TP-Link smart plug | 270,178 | 2,603 (0.96%) |
| Netatmo camera | 1,492,564 | 2,424 (0.16%) |

Processing Cost

The processing cost of packet inspection (done by the MUD policy engine) for extracting DNS bindings was also evaluated. It is noted that the inspection of packets is only used for tightening up device flows inserted into the switch, although it could also be used to further inspect packets after anomalous traffic is flagged.

TABLE 8

Comparison of attacks detection between the described apparatus and Snort

| IoT device | Detected wild attackers (by our solution) | Detected attacks (by Snort) |
|---|---|---|
| WeMo Motion | {107.170.227.13} | {107.170.227.13}, SSDP reflection(I→d→I) |
| WeMo Switch | {107.170.228.161} | {107.170.228.161} |
| Samsung Smartcam | {103.29.71.94, 45.55.2.34, 107.170.229.67, 45.55.14.102, 181.214.206.55, 216.98.153.254, 54.215.173.102, 14.134.5.4, 205.209.159.120} | {103.29.71.94, 45.55.2.34, 107.170.229.67, 45.55.14.102}, SNMP reflection(I→d→I) |

TABLE 8-continued

Comparison of attacks detection between the described apparatus and Snort

| IoT device | Detected wild attackers (by our solution) | Detected attacks (by Snort) |
|---|---|---|
| TP-Link Smart Plug | {107.170.226.164, 185.170.42.66, 46.182.25.42, 45.227.254.243, 185.156.177.13, 17.136.0.172, 125.212.217.214, 107.170.225.175, 217.182.197.186} | {107.170.226.164, 185.170.42.66, 46.182.25.42, 45.227.254.243} |
| Netatmo Camera | {58.182.245.89, 27.75.133.76, 14.234.90.16, 103.4.117.85, 177.74.184.229, 176.36.241.230, 81.17.18.221, 201.174.9.186, 194.208.107.25, 161.97.195.135, 189.165.40.237} | {58.182.245.89, 27.75.133.76, 14.234.90.16. 103.4.117.85} |

TABLE 9

Performance of other anomaly detectors

| IoT device | TPR (%) | FPR (%) |
|---|---|---|
| WeMo motion | 53.60 | 3.59 |
| WeMo switch | 86.11 | 1.26 |
| Samsung smartcam | 56.00 | 7.80 |
| TP-Link smart plug | 94.94 | 1.29 |
| Netatmo camera | 0.00 | 2.13 |

Table 7 shows the total number of packets versus the number of inspected packets measured over a 16-day period. It is seen that a small fraction of packets (i.e., less than 1.16% on average) is mirrored to the (MUD policy) inspection engine 236 (averaged across all devices)—this highlights that the inspection software receives a minimal amount of traffic, and supports the scalability of the SDN-based approach.

In summary, IoT devices (as opposed to typical computers or smartphones) generate a relatively small number of flows, and use them frequently. As explained above, some of these frequent flows are captured (right after their occurrence) by reactive flow rules inserted into a network switch by the described apparatus, and therefore subsequent packets do not need to be inspected, reducing the load on the inspection engine. It is seen that the fraction of inspected packets is the highest (i.e. 1.61%) in Table 7 for the WeMo motion device. Interestingly, 99.5% of inspected packets were DNS responses, with an average rate of 3.13 packets per minute.

Comparison with Existing Methods

Lastly, the performance of the apparatus and process described herein was compared with the performance of existing tools and proposals, starting with Snort, a widely deployed, open-source, signature based IDS.

Snort IDS: the Snort IDS was configured with the community rule-set and the packet traces from the 16-day period were replayed to Snort IDS using the tcpreplay tool.

Table 8 lists the IP addresses of endpoints on the Internet that attacked the testbed during the experiments, and were detected by the specification-based intrusion detector because these Internet endpoints were not specified by the MUD profiles of the IoT devices. These wild attacks from the Internet were seen after port forwarding was enabled on the gateway. According to AbuseIPDB, most of these endpoints have been reported as abusive IP addresses (e.g., 181.214.206.55 has a probability of 46% as being an abusive IP address). It can be seen that Snort detects a subset of these attacks—attacks from IP addresses in bold text are not detected by Snort. In addition, out of 40 types of the intended attacks, Snort detected only two, namely SSDP reflection (I→d→I) to the WeMo motion, and SNMP reflection (I→d→I) to the Samsung camera, as shown by italic text in Table 8. These two types of attacks (detected by Snort) carry traffic towards the local network and their signature was known to Snort, whereas the majority of the intended attacks were specifically designed for IoT devices, and Snort does not have the signature for most of them.

Other machine learners: Machine learning methods have been previously used to detect anomalies, although to the inventors' knowledge this has always been based on binary classification and using both benign and attack traffic for training, which limits the scalability of using such methods in an operational network. It is also noted that packet/byte counters have also been previously used as training features for machine learning, but at the device-level only (i.e., two features: aggregate bytes and packets of all flows). To demonstrate the superiority of the processes described herein, the anomaly detection process was modified to use only these two attributes, and the results are illustrated in Table 9. It is apparent that the overall performance (across 5 devices) is very poor compared to the processes described herein, with no attacks detected for the Netatmo device, and half of the attacks being missed for the WeMo motion and Samsung smartcam devices. In addition, this single machine approach does not provide any indication of attack flows.

The attack detection apparatuses and processes described herein combine specification-based and anomaly-based intrusion detection techniques. The described network based approach not only detects attacks on IoT devices from the local network and the Internet, but also detects attacks originating from these devices. The inspection cost of the described process and apparatus is very low compared to existing signature-based security systems. The apparatuses and processes described herein achieved a reasonably low rate (i.e., overall 3.22%) of false positives, this being a common problem with existing anomaly detectors. The described apparatuses and processes only use benign traffic for training (i.e., one-class classifiers only) that makes it easier to scale, as collecting labelled attack training instances (in addition to benign) for a large number of devices would be cumbersome (i.e., two-class classifier). The described apparatuses and processes are also able to flag the attack at the flow level.

The efficacy of the described apparatuses and processes has been demonstrated with a selected set of volumetric network attacks designed to conform to device MUD profiles. Nevertheless, the described apparatuses and processes are still able to detect other types of volumetric attacks. For example, port-scans are detected by the specification-based module because probing packets do not conform to the MUD profiles of IoT devices. Moreover, application layer attacks (e.g., HTTP, HTTPS, DNS, and SMTP) can also be detected because any volumetric change (even a short burst) impacts the corresponding flow counters, thus raising an alarm for anomalous traffic volume.

The responsiveness of the described apparatuses and processes depends on the frequency of flow-level telemetry (i.e., a polling period of one minute in the described embodiments). In general, the polling frequency is limited by SDN deployment (i.e., agents on the SDN switch, the number of switches, and the capability of the SDN controller).

Many modifications will be apparent to those skilled in the art without departing from the scope of the present invention.

The invention claimed is:

1. A method for analyzing network behavior of an Internet of Things (IoT) device, the method comprising:
processing a reference profile of the IoT device to generate a corresponding network traffic flow;
constructing at least one waveform of network activity over multiple time scales, wherein the at least one waveform is constructed on a per network traffic flow basis;
computing at least one statistical measure from the at least one waveform of network activity to create a behavioral volumetric set of characteristics for the IoT device;
training a set of one-class classifiers with training data from the expected behaviour of the IoT device during a period of time; and
applying a one-class classifier of the set of one-class classifiers to the behavioral volumetric set of characteristics for the IoT device, comprising using a clustering-based outlier detection algorithm to detect anomalous device behaviour.

2. The method of claim 1, wherein the reference profile is based at least in part on a Manufacturer Usage Description (MUD) specification.

3. The method of claim 1, wherein the processing the reference profile of the IoT device to generate the corresponding network traffic flow comprises storing the generated traffic flow in a flow table on the programmable network switch.

4. The method of claim 1, wherein the constructing the at least one waveform of network activity over the multiple time scales comprises receiving at least one flow counter and updating the waveform.

5. The method of claim 1, wherein computing the at least one statistical measure comprises performing dimensionality reduction, wherein the performing dimensionality reduction includes at least one of: eliminating at least one redundant statistical measure or combining at least one statistical measure to reduce a dimensionality of the behavioral volumetric set of characteristics.

6. The method of claim 5, wherein the performing the dimensionality reduction further comprises: using at least one principal component analysis to reduce the dimensionality of the behavioral volumetric set of characteristics.

7. The method of claim 1, wherein the at least one waveform of network activity over multiple time scales includes at least one of: a byte count or a packet count.

8. The method of claim 1, wherein computing the at least one statistical measure from the at least one waveform of network activity to create the behavioral volumetric set of characteristics for the IoT device comprises calculating at least one of: a total, a means, or a standard-deviation of the statistical measure.

9. The method of claim 1, wherein the applying the one-class classifier to the behavioral volumetric set of characteristics for the IoT device comprises determining whether the behavioral volumetric set of characteristics conforms with an expected behaviour of the IoT device.

10. The method of claim 1, wherein the clustering-based outlier detection algorithm to detect anomalous device behaviour includes at least one of an instantaneous boundary detection or a boundary detection over a continuous time scale.

11. A system for analyzing network behavior of an Internet of Things (IoT) device, the system comprising at least one processor configured to:
process a reference profile of the IoT device to generate a corresponding network traffic flow;
construct at least one waveform of network activity over multiple time scales, wherein the at least one waveform is constructed on a per network traffic flow basis;
compute at least one statistical measure from the at least one waveform of network activity to create a behavioral volumetric set of characteristics for the IoT device;
train a set of one-class classifiers with training data from the expected behaviour of the IoT device during a period of time; and
apply a one-class classifier of the set of one-class classifiers to the behavioral volumetric set of characteristics for the IoT device, using a clustering-based outlier detection algorithm to detect anomalous device behaviour.

12. The system of claim 11, wherein the reference profile is based at least in part on a Manufacturer Usage Description (MUD) specification.

13. The system of claim 11, wherein the at least one processor is configured to process the reference profile of the IoT device to generate the corresponding network traffic flow by storing the generated traffic flow in a flow table on the programmable network switch.

14. The system of claim 11, wherein the at least one processor is configured to construct the at least one waveform of network activity over the multiple time scales by receiving at least one flow counter and updating the waveform.

15. The system of claim 11, wherein the at least one processor is configured to compute the at least one statistical measure by performing dimensionality reduction, wherein performing dimensionality reduction includes at least one of: eliminating at least one redundant statistical measure or combining at least one statistical measure to reduce a dimensionality of the behavioral volumetric set of characteristics.

16. The system of claim 15, wherein the at least one processor is configured to perform the dimensionality reduction by using at least one principal component analysis to reduce the dimensionality of the behavioral volumetric set of characteristics.

17. The system of claim 11, wherein the at least one waveform of network activity over multiple time scales includes at least one of: a byte count or a packet count.

18. The system of claim 11, wherein at least one processor is configured to compute the at least one statistical measure from the at least one waveform of network activity to create the behavioral volumetric set of characteristics for the IoT device by calculating at least one of: a total, a means, or a standard-deviation of the statistical measure.

19. The system of claim 11, wherein the at least one processor is configured to apply the one-class classifier to the behavioral volumetric set of characteristics for the IoT device by determining whether the behavioral volumetric set of characteristics conforms with an expected behaviour of the IoT device.

20. The system of claim 11, wherein the algorithm to detect the anomalous device behaviour includes at least one of: an instantaneous boundary detection algorithm or a boundary detection over a continuous time scale algorithm.

* * * * *